United States Patent Office 3,814,822
Patented June 4, 1974

3,814,822
PROCESS FOR PREPARING A COATED READY-TO-EAT BREAKFAST CEREAL
Larry J. Henthorn, Crystal Lake, and Frank R. Kincs, Barrington, Ill., assignors to The Quaker Oats Company, Chicago, Ill.
No Drawing. Filed Feb. 22, 1972, Ser. No. 228,311
Int. Cl. A23l 1/10, 1/18
U.S. Cl. 426—293                                     4 Claims

ABSTRACT OF THE DISCLOSURE

A process for the preparation of a pre-sweetened, moisture resistant ready-to-eat breakfast cereal is disclosed which includes applying a hard butter containing crystalline sugar to the breakfast cereal.

BACKGROUND OF THE INVENTION

Field of the invention

This invention relates to sugar coated ready-to-eat breakfast cereal and process for the preparation thereof.

Description of the prior art

Sweetened ready-to-eat breakfast cereals have been known in the art for some time. They are generally prepared by the application of a syrup containing sugar, oil, and water to the surface of the cereal piece followed by drying the syrup coated cereal piece at temperatures ranging from 250° F. to 350° F. Less commonly the sweetened ready-to-eat breakfast cereals have been prepared by coating the cereal piece with a white or pastel confectionery coating prepared by techniques well known in the confectionery art.

While both of the above techniques provide a sweetened ready-to-eat breakfast cereal which is resistant to the uptake of moisture, most importantly the absorption of milk, neither provides a cereal which is coated with coarse granules of crystalline sugar. If coarse granules could be used less sugar would be needed to realize a sweetened effect.

Methods for applying crystalline sugar to a ready-to-eat breakfast cereal have been proposed but result in cereal products which are not particularly resistant to the uptake of moisture. For example, crystalline sugar has been bound to cereal pieces by such edible binding agents as water-soluble gelatin, guar gum, pregelatinized starch, sodium carboxymethylcellulose, methylcellulose, and shellac.

SUMMARY OF THE INVENTION

Accordingly, one object of the present invention is to provide a ready-to-eat breakfast cereal which is pre-sweetened with crystalline sugar and is moisture resistant.

Another object is to provide a process for forming a ready-to-eat breakfast cereal which is pre-sweetened with crystalline sugar and is moisture resistant.

Still another object is to provide a process for forming a ready-to-eat breakfast cereal which has visual and organoleptic acceptance.

Other objects will be apparent to one skilled in the art in view of the following description of the invention.

The objects of this invention are accomplished by a ready-to-eat breakfast cereal product having a coating comprising 10 to 40 percent by weight of crystalline sugar dispersed in 90 to 60 percent by weight of a hard butter having a Wiley melting point of 90° F. to 105° F. and a solid fat index as follows:

| Temperature ° F.: | Percent solids |
|---|---|
| 80 | 21–59 |
| 92 | 7–23 |
| 100 | 4–5 | said coating comprising 15 to 40 percent by weight of the breakfast cereal product.

The objects of this invention are further accomplished by a process for making a ready-to-eat cereal product sweetened and repellent to moisture which comprises applying in liquid form to the surface of the cereal product 15 to 40 percent by weight of a slurry comprising 10 to 40 percent by weight of a slurry comprising 10 to 40 percent by weight of crystalline sugar, preferably from 15 to 30 percent, and 90 to 60 percent by weight of a hard butter having a Wiley melting point of 90 to 105° F. and a solid fat index as follows:

| Temperature ° F.: | Percent solids |
|---|---|
| 80 | 21–59 |
| 92 | 7–23 |
| 100 | 4–5 |

By ready-to-eat breakfast cereals, we mean those products which are produced from cereal grain and subjected to a starch gelatinization step. The grain in the cereal product may be for example rice, wheat, oats, corn, barley, or any combination of two or more such grains. Sugar, fat, and a variety of other flavoring materials may be present within the dough or sprayed on the surface of the cereal product. The ready-to-eat breakfast cereal may be formed into a variety of shapes and sized by well-known techniques in the art and may be subjected to a variety of additional processing steps. Some of these are toasting, drying, cooking and puffing, and the like. In order to make these products edible, however, they all must undergo some measure of starch gelatinization.

The "hard butters" used in this invention are vegetable fats or glyceridic oils such as shortening, lard, butter, coconut oil, cotton seed oil, soybean oil, palm oil, corn oil, peanut oil, sunflower seed oil, safflower oil, olive oil, and the like or mixtures thereof. These oils are treated, as by hydrogenation, interesterification, or fractional crystallization, and blending of oils with harder butters so as to stabilize the oils and modify their melting points consistent with the desired melting point temperature range of 90° F. to 105° F. and a solid fat index as follows:

| Temperature ° F.: | Percent solids |
|---|---|
| 80 | 21–59 |
| 92 | 7–23 |
| 100 | 4–5 |

It is essential to this invention that the hard butter have the specified characteristics. The solid fat index as set forth above and below was determined by method Cd 10–57, Official and Tentative Methods of the American Oil Chemist's Society. If the melting point is below 90° F. the coating will soften when stored under normal ambient conditions causing the coated cereal pieces to stick together. Hard butter having a softening point above 105° F. will provide a coating which when chewed seems waxy. The percent solids of the hard butter particularly at 80° F. and higher, is particularly important inasmuch as it is necessary that the hard butter melt in the mouth of the consumer releasing the crystalline sugar dispersed therein. It is preferred that the hard butter have the additional characteristics:

| Temperature ° F.: | Percent solids |
|---|---|
| 50 | 30–72 |
| 70 | 24–66 |

Commercially available hard butters include the following: Kaomel, Kaokote, and Paramount B which are sold by Durkee Famous Food. Kaomel is hydrogenated soybean oil; Kaokote is hydrogenated soybean oil, cotton seed oil, or mixtures thereof; and Paramount B is a blend of hydrogenated coconut and palm kernel oils.

The crystalline sugar preferably should be crystalline sucrose having a relatively coarse granulation. For best results, it is preferred that the particle size be such that at least 60 percent is retained on a U.S. 100 standard mesh screen. By using crystals which are relatively large, it has been found that a smaller amount of sugar is generally needed than when a noncrystalline sugar, e.g., syrup or pastel confectionery coating is used to coat the cereal piece. While we do not wish to be bound by any theory, this effect is perhaps explained by the fact that more surface area of the sugar crystals is exposed, thus enabling the user to realize a sweetened effect which is the equivalent of a higher percentage of sugar in a syrup or a pastel confectionery coating. It is to be recognized that a small amount of sugar of finer particle size can be tolerated.

The crystalline sugar and the hard butter are applied to the ready-to-eat breakfast cereal in liquid form as a slurry. By slurry we mean to include colloidal as well as particulate or mechanical dispersions. The slurry is preferably prepared by adding the crystalline sugar to the hard butter, holding the admixture at a temperature sufficient to liquefy it, and agitating the admixture to produce the slurry. Other materials such as salt, vitamins, minerals, antioxidants, colorants, flavorings, flavor enhancers, flavor potentiators, etc., which can be dissolved or suspended in the hard butter may be substituted for part of the crystalline sugar in the slurry. Temperatures above the temperature sufficient to liquefy the slurry can be used but are not necessary. When heat degradeable vitamins such as vitamin A, vitamin B, vitamin $B_{12}$, vitamin C, and vitamin D or other heat unstable materials are added to the slurry, heating the slurry to temperatures much above that necessary to liquefy it or for prolonged periods of time should be avoided.

The slurry may be applied in liquid form to the cereal grain product by spraying, by tumble enrobing, or by any other conventional method. In each case, the object is to evenly distribute the slurry around the product. After coating the cereal grain product with the slurry, the product is immediately ready for human or animal consumption or for packaging.

DESCRIPTION OF THE PREFERRED EMBODIMENTS

The following embodiments of this invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

Example 1

A slurry was prepared from 40 parts by weight of granulated sugar and 60 parts by weight of Kaomel. The Kaomel had a Wiley melting point of 97–101° F. and a solid fat index as follows:

| Temperature ° F.: | Percent solids |
|---|---|
| 50 | 72±3 |
| 70 | 66±3 |
| 80 | 59±3 |
| 92 | 23±3 |
| 100 | 5.0 |

70 parts by weight of a ready-to-eat breakfast cereal and 30 parts of the slurry in liquid form prepared above were tumbled together. The coated cereal when placed in milk had sufficient bowl life that it did not become soggy in the time necessary to consume it. The coated cereal had a pleasant, pre-sweetened flavor when eaten.

Example 2

The procedure of Example 1 was repeated except that 85 parts by weight of a ready-to-eat breakfast cereal and 15 parts by weight of the slurry in liquid form were tumbled together. As in Example 1, the coated cereal had a pleasant pre-sweetened taste and did not become soggy in milk in the time reasonably necessary to consume it.

From the foregoing description we consider it to be clear that the present invention contributes a substantial benefit to the cereal art by providing a new and useful pre-sweetened and moisture resistant ready-to-eat breakfast cereal product and the process for the preparation thereof.

We claim:
1. A process for making a ready-to-eat cereal product sweetened and repellent to moisture which comprises applying in liquid form to the surface of the cereal product 15 to 40 percent by weight of a slurry comprising 10 to 40 percent by weight of crystalline sugar and 90 to 60 percent by weight of a hard butter having a Wiley melting point of 90° F. to 105° F. and wherein the solid fat index of the hard butter is as follows:

| Temperature ° F.: | Percent solids |
|---|---|
| 80 | 21–59 |
| 92 | 7–23 |
| 100 | 4–5 | said slurry being applied to the surface by being evenly distributed around the product.

2. The process as in claim 1 wherein additionally the solid fat index of the hard butter is as follows:

| Temperature ° F.: | Percent solids |
|---|---|
| 50 | 30–72 |
| 70 | 24–66 |

3. The process as in claim 1 wherein the crystalline sugar comprises 15 to 30 percent of the slurry.

4. The process as in claim 1 wherein the crystalline sugar has a particle size whereby at least 60 percent of it is retained on a U.S. 100 standard mesh screen.

References Cited

UNITED STATES PATENTS

| 3,615,676 | 10/1971 | McKown | 99—83 |
| 3,484,250 | 12/1969 | Vollink et al. | 99—83 |
| 2,607,691 | 8/1952 | Bettman | 99—83 |

RAYMOND N. JONES, Primary Examiner

U.S. Cl. X.R.

426—302, 73